United States Patent
Diaz et al.

(10) Patent No.: US 8,991,191 B2
(45) Date of Patent: Mar. 31, 2015

(54) THERMALLY ACTUATED PASSIVE GAS TURBINE ENGINE COMPARTMENT VENTING

(75) Inventors: Carlos Enrique Diaz, Cincinnati, OH (US); Daniel Jean-Louis Laborie, West Chester, OH (US); Stephen Dennis Geary, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1499 days.

(21) Appl. No.: 12/624,858

(22) Filed: Nov. 24, 2009

(65) Prior Publication Data
US 2011/0120075 A1    May 26, 2011

(51) Int. Cl.
*F16K 31/12* (2006.01)
*F16K 17/38* (2006.01)
(Continued)

(52) U.S. Cl.
CPC ............... *F02K 1/822* (2013.01); *B64D 29/00* (2013.01); *B64D 2033/024* (2013.01); *B64D 2045/009* (2013.01); *F02K 1/383* (2013.01); *Y02T 50/672* (2013.01); *F05D 2270/112* (2013.01); *F05D 2270/09* (2013.01); *F05D 2270/3032* (2013.01); *F05D 2270/64* (2013.01); *F01D 25/14* (2013.01); *F05D 2260/20* (2013.01); *Y02T 50/676* (2013.01)
USPC .............. 60/795; 60/782; 60/39.091; 60/785; 251/11

(58) Field of Classification Search
USPC ........ 60/782, 785, 795, 39.091, 226.1, 226.2, 60/226.3, 229, 230; 417/208, 321; 251/11
See application file for complete search history.

(56) References Cited

U.S. PATENT DOCUMENTS

| 4,825,644 | A | | 5/1989 | Bubello et al. |
| 5,022,817 | A | * | 6/1991 | O'Halloran .................. 415/115 |

(Continued)

FOREIGN PATENT DOCUMENTS

| EP | 1610606 A1 | 12/2005 |
| EP | 1998019 A1 | 12/2008 |

(Continued)

OTHER PUBLICATIONS

"Thermal Actuators", Solid-Liquid Phase Change Actuators, Therm-Omega-Tech, Inc., ISO 9001 Certified, 2 pages.
(Continued)

*Primary Examiner* — Ehud Gartenberg
*Assistant Examiner* — Karthik Subramanian
(74) *Attorney, Agent, or Firm* — General Electric Company; Pamela A. Kachur

(57) ABSTRACT

A thermally actuated venting system includes a thermally actuated vent for opening a vent outlet in a gas turbine engine associated compartment with a passive thermal actuator located in the compartment based on a temperature of the compartment. Outlet may be located at or near a top of a core engine compartment, a fan compartment, or a pylon compartment. Actuator may be operably connected to a hinged door of vent for opening outlet. Actuator may be actuated by a phase change material disposed in a chamber and having a liquid state below a predetermined actuation temperature and a gaseous state above the predetermined actuation temperature. Actuator may include a thermal fuse for closing door during a fire. Thermal fuse may include at least a portion of piston rod or a cylinder wall of actuator being made of a fuse material having a melting point substantially above the predetermined actuation temperature.

10 Claims, 9 Drawing Sheets

(51) Int. Cl.
*F16K 17/40* (2006.01)
*F02C 9/46* (2006.01)
*F02C 6/04* (2006.01)
*F02K 1/82* (2006.01)
*B64D 29/00* (2006.01)
*F02K 1/38* (2006.01)
*F01D 25/14* (2006.01)
*B64D 33/02* (2006.01)
*B64D 45/00* (2006.01)

(56) References Cited

U.S. PATENT DOCUMENTS

| | | | |
|---|---|---|---|
| 5,127,222 A | 7/1992 | Ream et al. | |
| 5,239,817 A | 8/1993 | Mildenstein et al. | |
| 5,284,012 A | 2/1994 | Laborie et al. | |
| 5,285,636 A | 2/1994 | Mayo et al. | |
| 5,316,437 A | 5/1994 | Czachor | |
| 5,369,954 A | 12/1994 | Stuart | |
| 5,623,820 A * | 4/1997 | Balzer et al. | 60/39.091 |
| 5,996,331 A * | 12/1999 | Palmer | 60/782 |
| 6,116,852 A * | 9/2000 | Pierre et al. | 415/115 |
| 6,202,403 B1 * | 3/2001 | Laborie et al. | 60/39.83 |
| 6,282,881 B1 * | 9/2001 | Beutin et al. | 60/39.08 |
| 7,213,391 B2 * | 5/2007 | Jones | 60/226.1 |
| 7,213,393 B2 | 5/2007 | Lapergue et al. | |
| 7,258,524 B2 * | 8/2007 | Friedel et al. | 415/115 |
| 7,373,779 B2 | 5/2008 | Czachor | |
| 7,437,871 B2 * | 10/2008 | Cook | 60/39.091 |
| 7,445,424 B1 * | 11/2008 | Ebert et al. | 415/113 |
| 7,624,567 B2 | 12/2009 | Peters | |
| 2006/0080950 A1 * | 4/2006 | Czachor | 60/226.1 |
| 2006/0237079 A1 | 10/2006 | Cheadle et al. | |
| 2007/0062199 A1 | 3/2007 | Cowan et al. | |
| 2007/0138337 A1 * | 6/2007 | Audart-Noel et al. | 244/53 R |
| 2007/0245711 A1 * | 10/2007 | Stretton | 60/226.1 |
| 2008/0142641 A1 * | 6/2008 | Moore et al. | 244/215 |
| 2008/0149761 A1 | 6/2008 | Nakazawa et al. | |
| 2009/0111370 A1 | 4/2009 | Porte et al. | |
| 2009/0175718 A1 | 7/2009 | Diaz et al. | |
| 2009/0253361 A1 | 10/2009 | Porte et al. | |
| 2010/0162704 A1 * | 7/2010 | Eifert | 60/670 |

FOREIGN PATENT DOCUMENTS

| | | |
|---|---|---|
| JP | 05-141268 A | 6/1993 |
| JP | 2003-035303 A | 2/2003 |
| JP | 2003-206909 A | 7/2003 |
| JP | 2005-201265 A | 7/2005 |
| JP | 2006-118502 A | 5/2006 |
| JP | 2007-085334 A | 4/2007 |
| JP | 2007-085335 A | 4/2007 |
| WO | 2008045093 A1 | 4/2008 |

OTHER PUBLICATIONS

European Search Report and Written Opinion issued from EP Application No. 10191341.6 on Jun. 5, 2014.

Unofficial translation of Japanese Office Action from Japanese Application No. 2010-256743 dated Jul. 15, 2014.

* cited by examiner

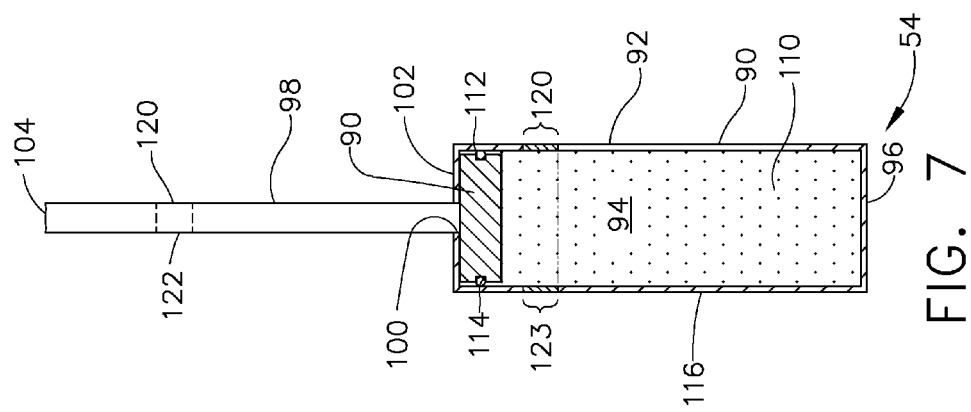
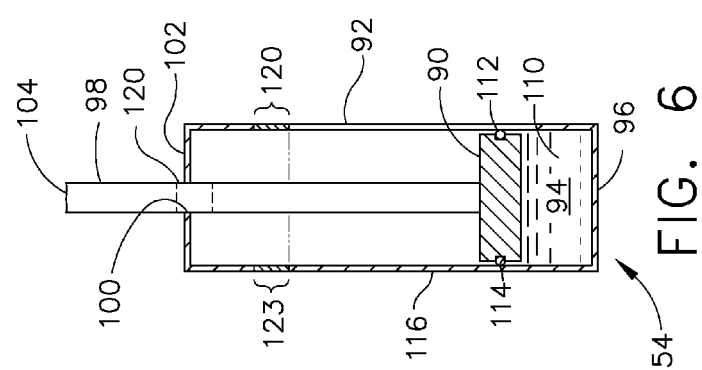

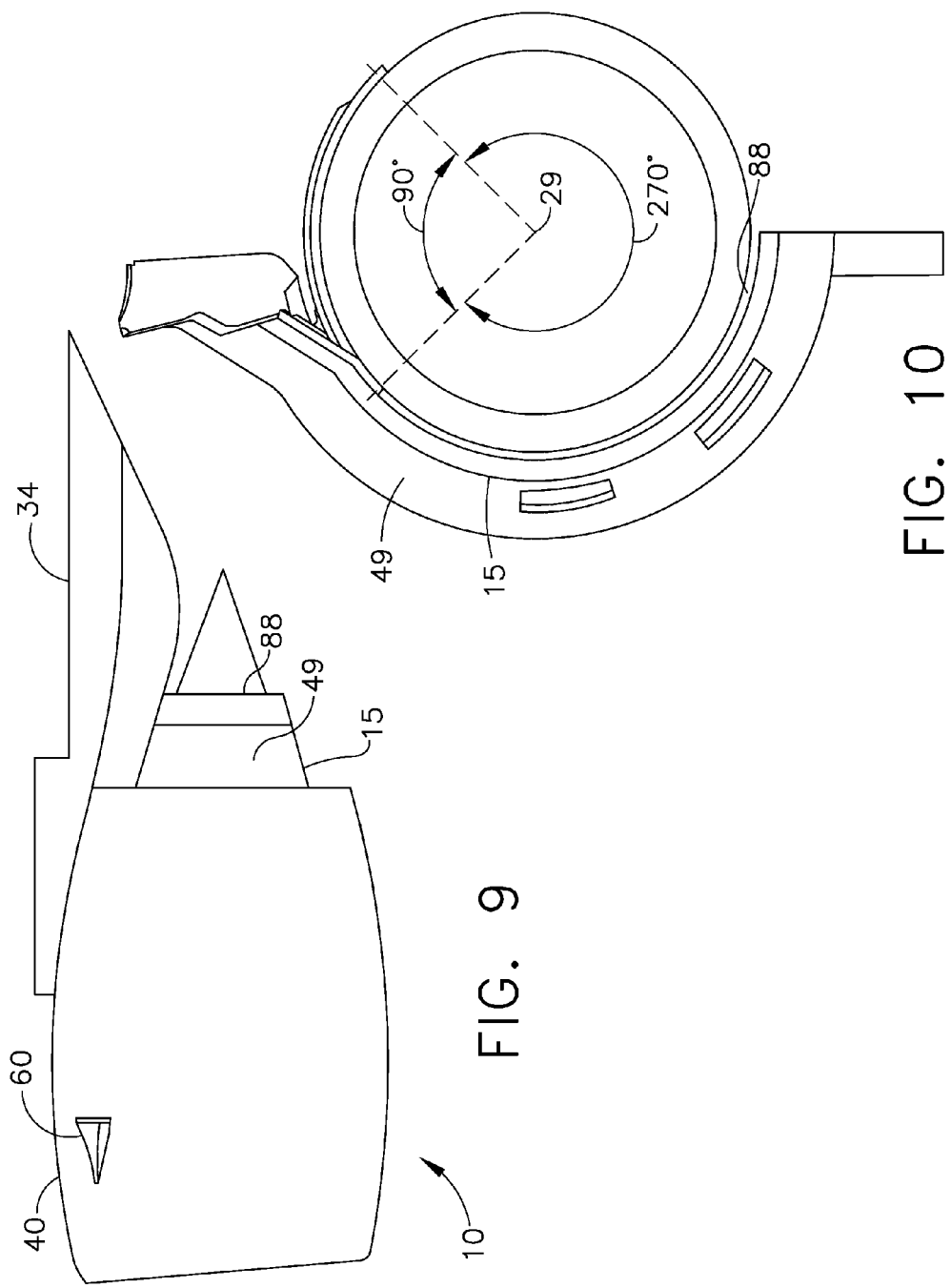

THERMALLY ACTUATED PASSIVE GAS TURBINE ENGINE COMPARTMENT VENTING

BACKGROUND OF THE INVENTION

1. Field of the Invention

The present invention relates to cooling gas turbine engine compartments by venting and, more particularly, to venting hot air from gas turbine engine compartments subject to soak back when the engine is shut down.

2. Description of Related Art

Aircraft gas turbine engines have many compartments associated with the engine that are subject to heating due to soak back. The engines typically include a fan, a low pressure compressor, a high pressure compressor, a combustor, a high pressure turbine, and a low pressure turbine. The high pressure compressor, combustor, and high pressure turbine are collectively referred to as a core engine. An engine nacelle system for the engine extends circumferentially about the engine, sheltering the engine and providing aerodynamic surfaces which cooperate with the turbofan engine for generating thrust. A typical engine nacelle system includes a fan compartment surrounding a fan case and a core nacelle surrounding the core engine. The core nacelle is radially spaced apart from the core engine and a core compartment extending around the core engine is located therebetween. The core nacelle is disposed radially inwardly of the fan compartment leaving a region therebetween for the fan air flowpath.

The core compartment houses various engine components and accessories. The components and accessories include aircraft and engine hydraulic system components with hydraulic fluid therein which is flowed to the aircraft and engine hydraulic systems. The hydraulic fluid begins to deteriorate above a certain temperature and the amount of deterioration is a function of the time that it remains at that temperature. The core compartment gets very hot during engine operation and the components and accessories therein may be adversely affected by overheating. The core compartment is typically ventilated during engine operation by cooling passages which flow a portion of cool pressurized air from the fan flowpath to the core compartment thus keeping the core compartment relatively cool during engine operation.

During engine shutdown and for a period of time after engine shutdown, sensible heat stored in the engine is transferred to air in the core compartment as well as the fan compartment. An electronic controller such as full authority digital electronic control (FADEC) may be stored in the fan compartment. The heat causes the temperature of the air to rise causing heating of components and accessories in the engine nacelles and especially components such as hydraulic conduits in the upper portion of the engine nacelle where the hottest nacelle air is gathered. There are engine designs such as the HF120 for the honda jet that place the engine controller in compartments in pylons supporting the engine. The pylon compartment, FADEC compartment, and core compartments are all examples of engine associated compartments that require cooling after engine shutdown to prevent soak back heat from overheating engine associated compartments.

Recently, some engines have been developed that require the FADEC to operate, thus generating heat (about 100 W), when the engine is shut down and no cooling is available for maintenance purposes. These compartments containing the FADEC require cooling after engine shutdown to prevent heat generated by the operating FADEC from building up in the compartment and overheating the FADEC.

Currently cooling is provided by passive systems that vent hot air in compartments through various vent holes and vent areas. It is highly desirable to provide a passive cooling system better able to cool engine associated compartments after engine shutdown to prevent soak back or sensible heat from overheating engine associated compartments.

SUMMARY OF THE INVENTION

A thermally actuated venting system includes a thermally actuated air vent for opening an air vent outlet in a gas turbine engine associated compartment and a passive thermal actuator in the compartment operable for opening the thermally actuated air vent based on a temperature of the compartment and venting hot air from the compartment. An exemplary embodiment of the system further includes the vent outlet being located at or near a top of the compartment. The associated compartment may be a core engine compartment circumscribed by a core engine cowl or a fan compartment or a pylon compartment.

The thermally actuated vent may include a hinged door operably connected to the thermal actuator for opening the vent outlet. A thermal fuse may be incorporated in the thermal actuator for closing the door during a fire in the compartment.

One embodiment of the thermal actuator includes a piston disposed within a cylinder, a chamber within the cylinder between the piston and a bottom wall of the cylinder, a piston rod extending upwardly from the piston through an aperture in a top wall of the cylinder, and a phase change material in the chamber having a liquid state below a predetermined actuation temperature and a gaseous state above the predetermined actuation temperature. A distal end of the piston rod may be connected to the hinged door.

The thermal fuse may include the piston rod or an annular cylinder wall of the cylinder or a portion thereof being made of a fuse material having a melting point substantially above the predetermined actuation temperature. The melting point may be in a range between 786 degrees and 1202 degrees Fahrenheit.

The associated compartment may be a fan compartment between a gas turbine engine fan cowl and a gas turbine engine fan casing and an have electronic engine control (ECU) mounted therein.

The associated compartment may be the core engine compartment circumscribed by a core engine cowl having the vent outlet located in an upper quadrant of the core engine cowl. The associated compartment may be a pylon compartment in a pylon used for mounting an engine above an aircraft wing. The top wall may be part of an engine exhaust deflector.

BRIEF DESCRIPTION OF THE DRAWINGS

The foregoing aspects and other features of the invention are explained in the following description, taken in connection with the accompanying drawings where:

FIG. 6 is a cross-sectional diagrammatical view illustration of a thermally activated actuator in a retracted position for the thermally actuated venting system illustrated in FIGS. 1-5.

FIG. 7 is a cross-sectional diagrammatical view illustration of the thermally activated actuator in an extended position for the thermally actuated venting system illustrated in FIGS. 1-5.

FIG. 9 is a side elevational view illustration of a gas turbine engine having an annular slot in the core engine cowl at an aft section of the core engine compartment.

FIG. 10 is an aft looking forward perspective view illustration of half of the slot illustrated in FIG. 9.

DETAILED DESCRIPTION OF THE INVENTION

Figure 1:
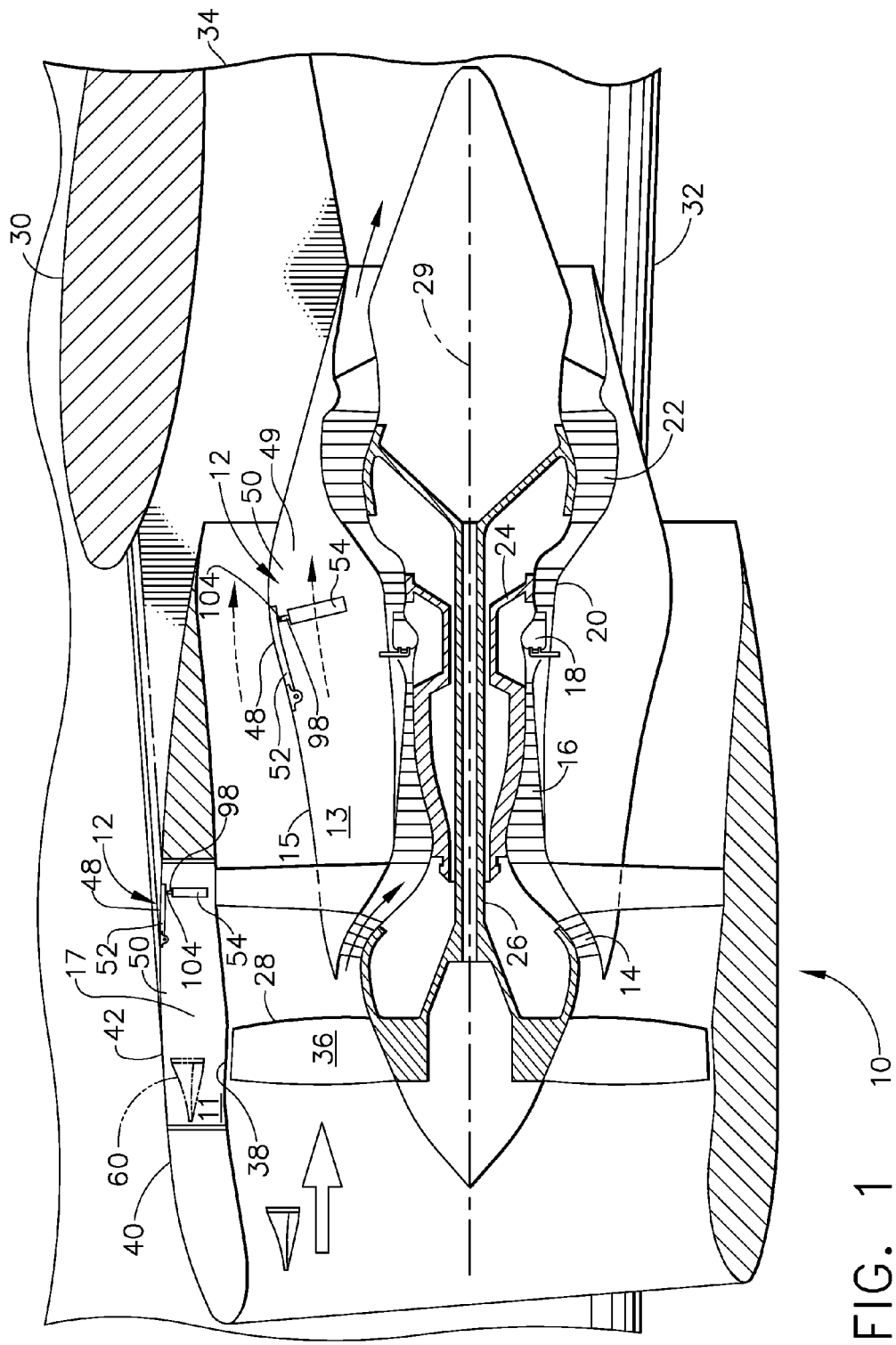
FIG. 1 is a partially perspective mostly cross-sectional view illustration of a gas turbine engine having thermally actuated venting systems for fan nacelle and core compartments.
Figure 2:
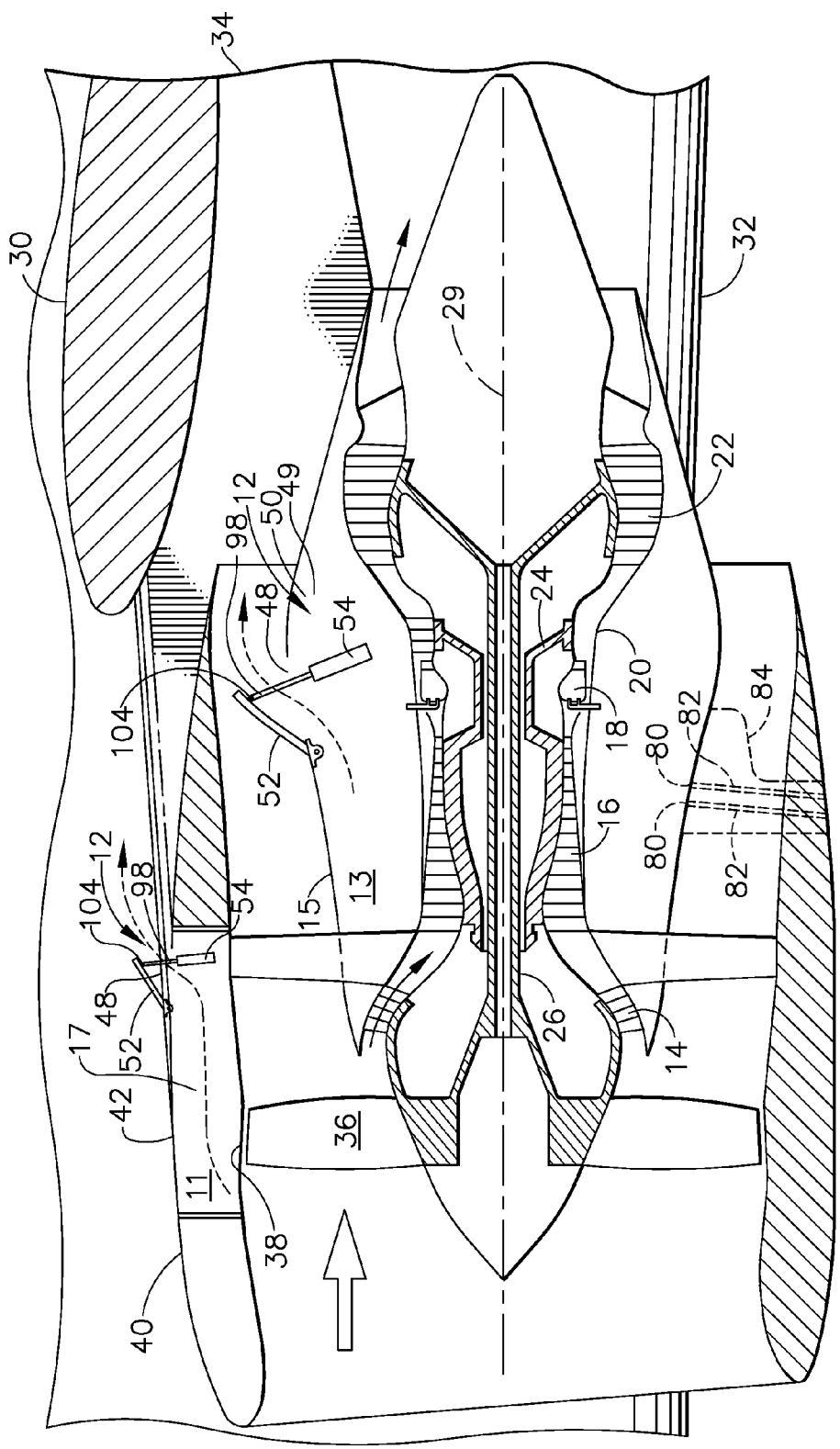
FIG. 2 is a cross-sectional view illustration of open vents in the thermally actuated venting systems illustrated in FIG. 1.
Figure 3:
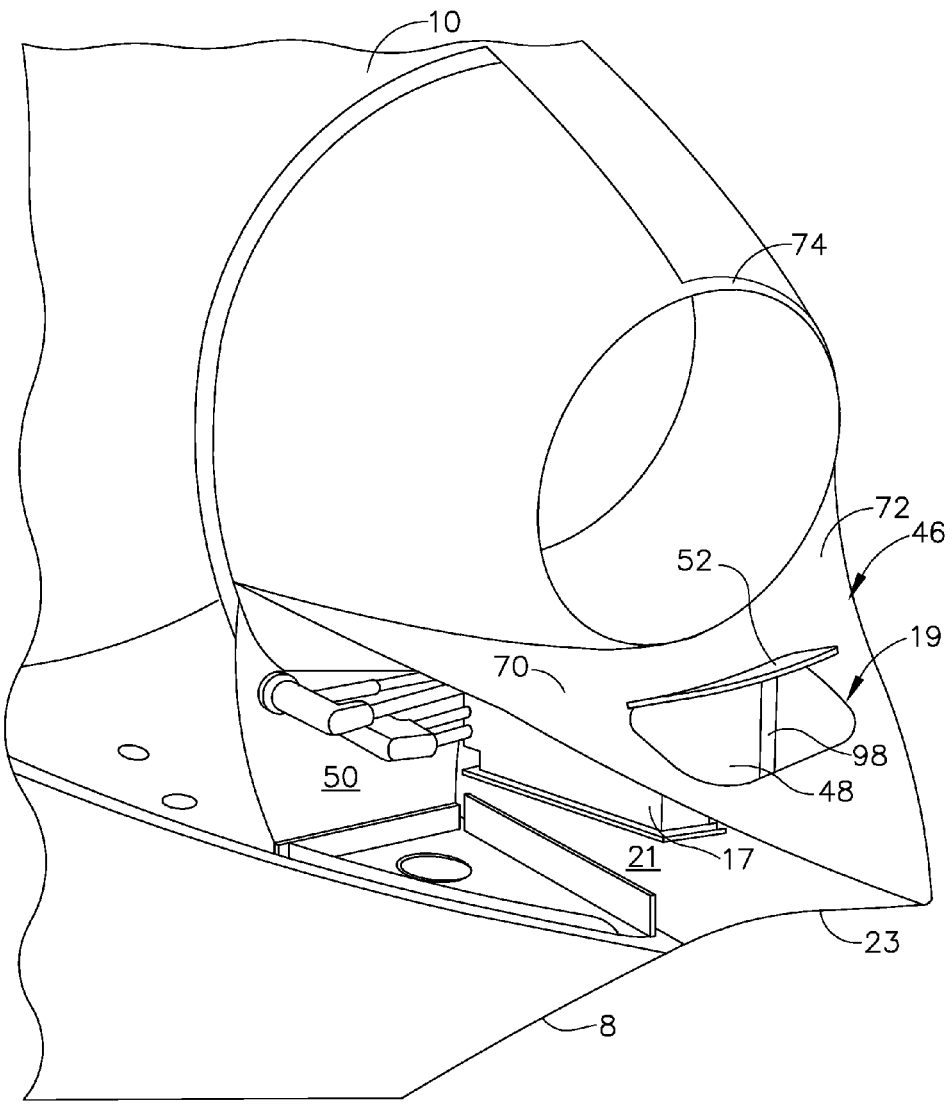
FIG. 3 is a perspective view illustration of a thermally actuated venting system for a compartment in a pylon supporting a gas turbine engine.
Figure 4:
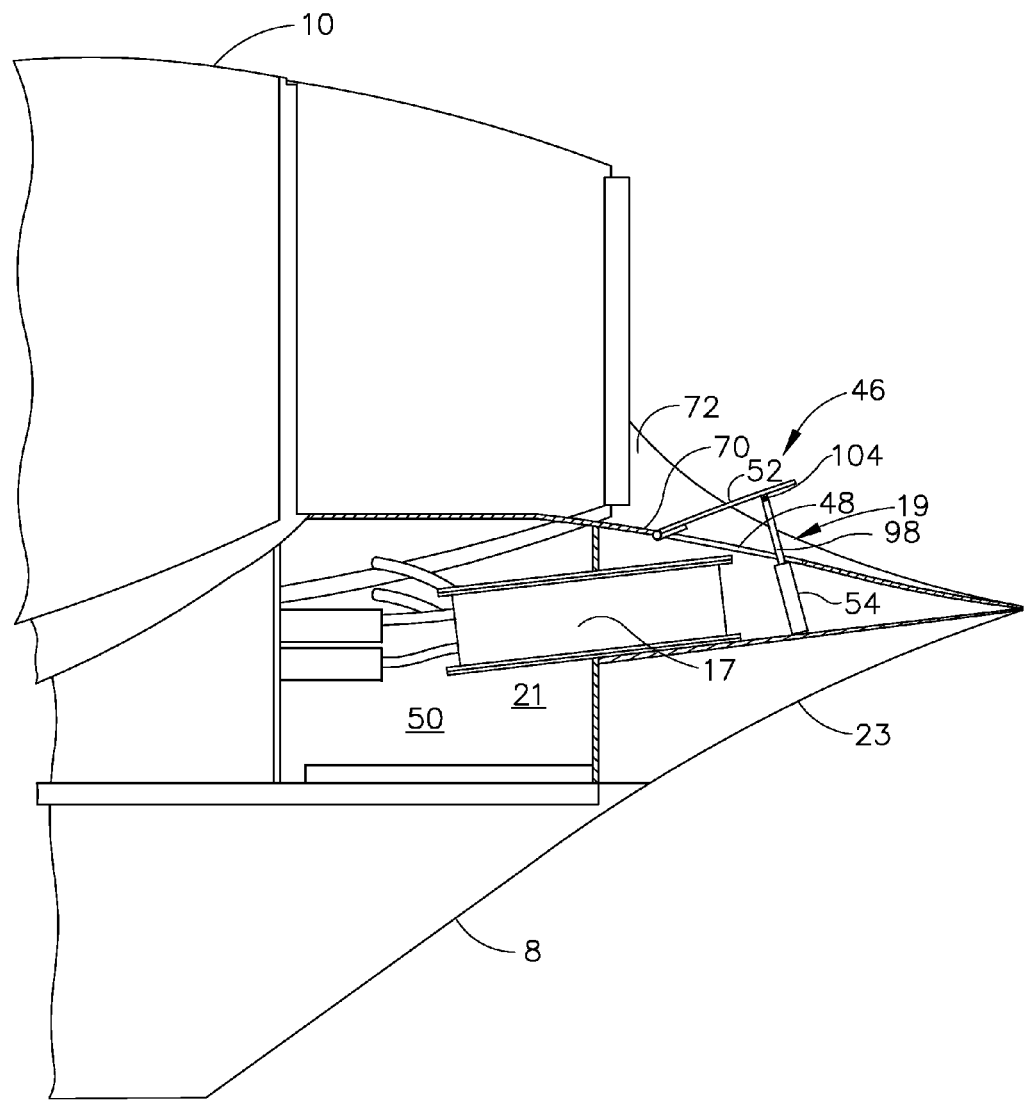
FIG. 4 is a cross-sectional view illustration of an open vent in the thermally actuated venting system illustrated in FIG. 3.
Figure 5:
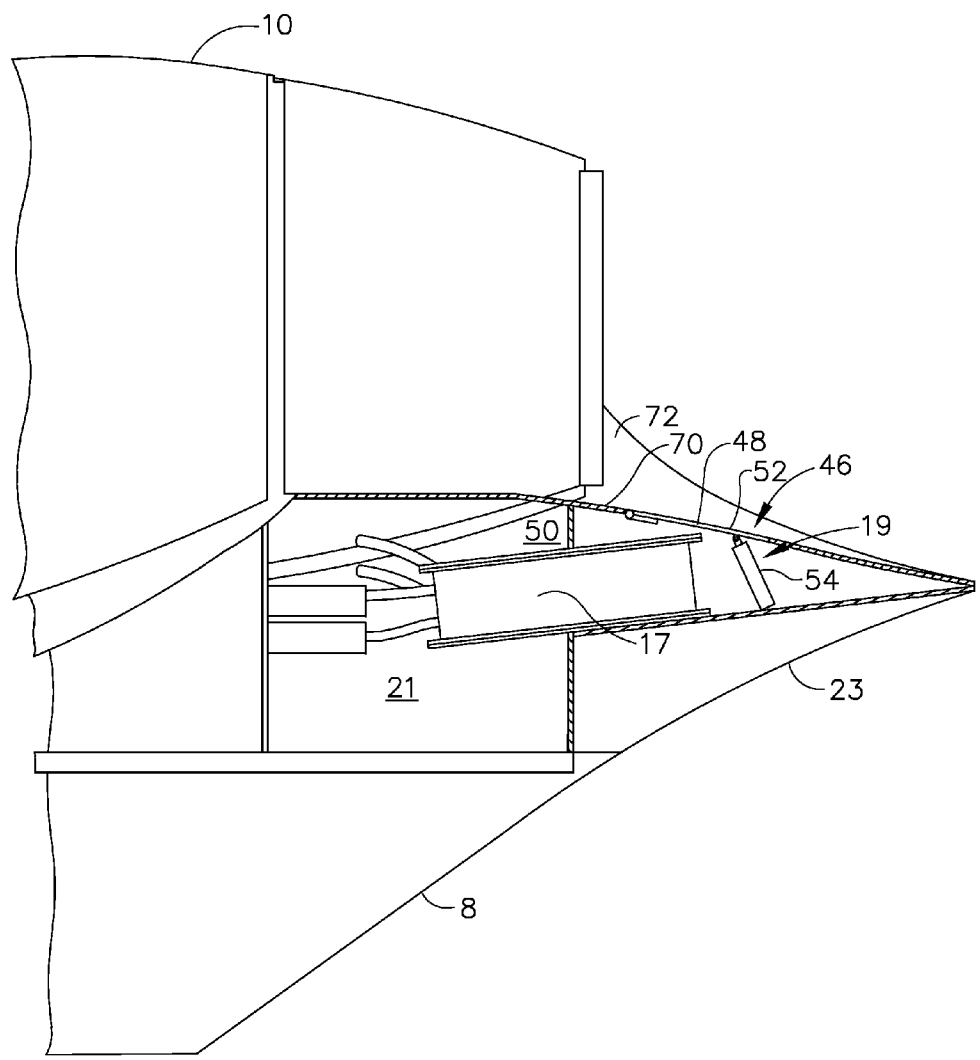
FIG. 5 is a cross-sectional view illustration of the vent closed in the thermally actuated venting system illustrated in FIG. 3.

FIGS. 1 and 2 illustrate an exemplary turbofan gas turbine engine 10 incorporating thermally actuated venting systems 12 for venting a fan compartment 11 containing an electronic engine control 17 which may be a full authority digital electronic control (FADEC) and for venting a core engine compartment 13 circumscribed by a core engine cowl 15. FIGS. 3, 4, and 5 illustrate a pylon compartment thermally actuated venting systems 19 for venting a pylon compartment 21 containing an electronic engine control 17 which may be a full authority digital electronic control (FADEC). The thermally actuated cooling systems disclosed herein are illustrated for venting hot air from and thus cooling down compartments associated with the engine 10 that are subject to heating due to soak back such as compartments inside an engine or its cowls or in a pylon 8 supporting the engine 10 above a wing 30 of an aircraft 6 illustrated in FIG. 11.

The exemplary engine 10 illustrated in FIGS. 1 and 2 includes, in downstream serial flow relationship, a fan 28, a booster or low pressure compressor 14, a high pressure compressor 16, a combustor 18, a high pressure turbine 20, and a low pressure turbine 22. The high pressure turbine 20 is drivingly connected to the high pressure compressor 16 with a high pressure shaft 24. The fan 28 and low pressure turbine 22 are drivenly connected to the low pressure compressor 14 and the fan 28 with a low pressure shaft 26 coaxially disposed within the high pressure shaft 24 about a longitudinal centerline axis 29 of engine 10.

The engine 10 is mounted below a wing 30 of an aircraft 32 by a pylon 34. The fan 28 includes fan blades 36 surrounded by a fan casing 38. A fan nacelle 40 including a fan cowl 42 is radially spaced apart from and surrounds the fan casing 38. An electronic engine control 17, such as a full authority digital electronic control (FADEC), is mounted to the fan casing 38 within the fan compartment 11 between the fan cowl 42 and the fan casing 38. A first thermally actuated venting system 12 includes a thermally actuated vent 46 for opening and closing a vent outlet 48 of the fan compartment 11. The vent outlet 48 is located at or near a top 50 of the fan compartment 11. The vent outlet 48 is illustrated herein as being located in the fan cowl 42 but may be located elsewhere in the nacelle. The thermally actuated vent 46 is used to vent the fan compartment 11 when it gets hot due to heating such as may occur during and after engine shutdown due to soak back. A more particular embodiment of the thermally actuated venting system 12 places the thermally actuated vent 46 near the FADEC. This is done because some engines have been developed that require the FADEC to operate, thus generating heat (about 100 W), when the engine is shut down and no cooling is available for maintenance purposes. These compartments containing the FADEC require cooling after engine shutdown to prevent heat generated by the operating FADEC from building up in the compartment and overheating the FADEC.

The thermally actuated vent 46 illustrated herein includes a hinged door 52 that is opened and closed by a passive thermal actuator 54 stored or mounted in the fan compartment 11. Other embodiments of the thermally actuated vent are contemplated, including, but not limited to thermally actuated valves. The thermal actuator 54 is actuated by heat of air surrounding the actuator and it is passive because it requires no external source of power such as mechanic, hydraulic, pneumatic, or electrical power to operate. The air has thermal mass and will open or close the thermal actuator depending on the temperature difference between the air surrounding it and an actuation temperature of the thermal actuator.

FIG. 1 illustrates the hinged door 52 closed when the thermal actuator 54 is fully retracted. FIG. 2 illustrates the hinged door 52 open when the thermal actuator 54 is fully extended. Thermal actuators are well known devices commercially available from manufacturers such as THERM-OMEGA TECH, Inc. having a place of business in Warminster, Pa. The thermal actuator 54 is set to open and close at a predetermined actuation temperature to prevent overheating of the fan compartment. A fan compartment inlet 60, illustrated in phantom line to indicate it is out of plane, to the fan compartment 11 allows cooler air to enter the compartment as hotter air and is vented out the open hinged door 52. There are many known types of fan compartment inlets, the one illustrated in FIG. 1 is a NACA inlet in the fan cowl 42 as further illustrated in FIGS. 8 and 9.

Figure 8:
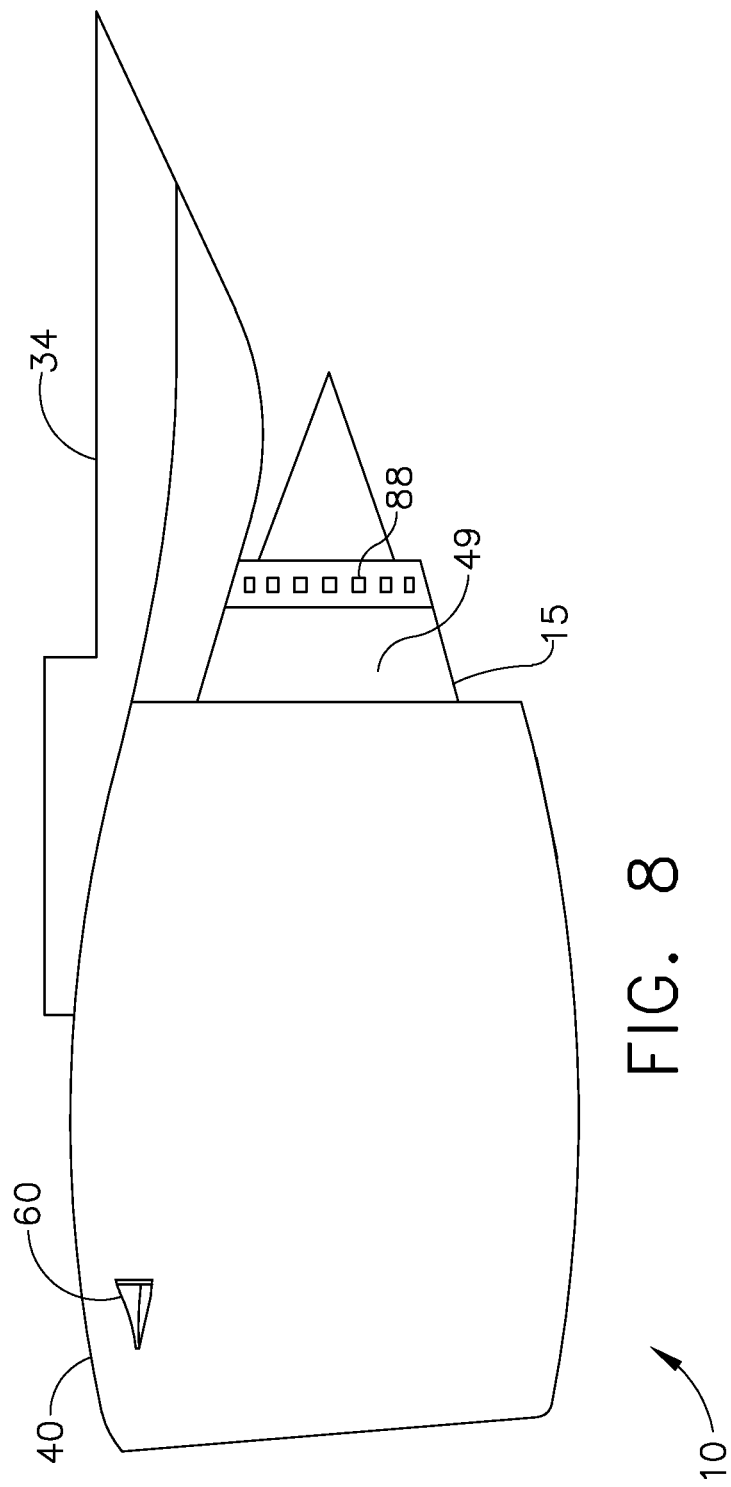
FIG. 8 is a side elevational view illustration of a gas turbine engine having vent apertures in a core engine cowl.

FIGS. 1 and 2 further illustrate a thermally actuated vent 46 for opening and closing a vent outlet 48 at or near a top 50 of the core engine compartment 13 that is circumscribed by a core engine cowl 15. The vent outlet 48 is illustrated herein as being located in the core engine cowl 15. The thermally actuated vent 46 and vent outlet 48 may be located in an upper quadrant 49 of the core engine cowl 15 as illustrated in FIGS. 1 and 10. The thermally actuated vent 46 is used to vent the core engine compartment 13 when it gets hot due to heating such as may occur during and after engine shutdown due to soak back. The thermally actuated vent 46 illustrated herein includes a hinged door 52 that is opened and closed by a thermal actuator 54 stored or mounted in the core engine compartment 13. Other embodiments of the thermally actuated vent are contemplated, including, but not limited to thermally actuated valves. FIG. 1 illustrates the hinged door 52 closed when the thermal actuator 54 is fully retracted and FIG. 2 illustrates the hinged door 52 open when the thermal actuator 54 is fully extended. The thermal actuator 54 is set to open and close at a predetermined actuation temperature to prevent overheating of the core engine compartment 13. There are various means for allowing cooler air to enter the core engine compartment 13. One such means is through one or more core engine compartment drain ports 80 located at or near a bottom of the core engine compartment 13. One or more drain lines 82 lead from the one or more core engine compartment drain ports 80 to a drain mast 84 which then provides a means for allowing cooler air to enter the core engine compartment 13 when the thermally actuated vent 46 is open. This allows cooler air to enter the as hotter air and is vented out the open hinged door 52. The thermal actuator 54 is set to open and close at predetermined opening and closing temperatures respectively to prevent overheating of the compartment. Other means for allowing cooler air to enter the core engine compartment 13 include vent apertures 86 in the core engine cowl 15 at an aft section of the core engine compartment 13 as illustrated in FIG. 8 or an annular slot 88 in the core engine cowl 15 at an aft section of the core engine compartment 13 as illustrated in FIGS. 9 and 10. The annular slot 88 typically extend around a sector of the core engine cowl 15, for example, 270 degrees.

Figure 11:
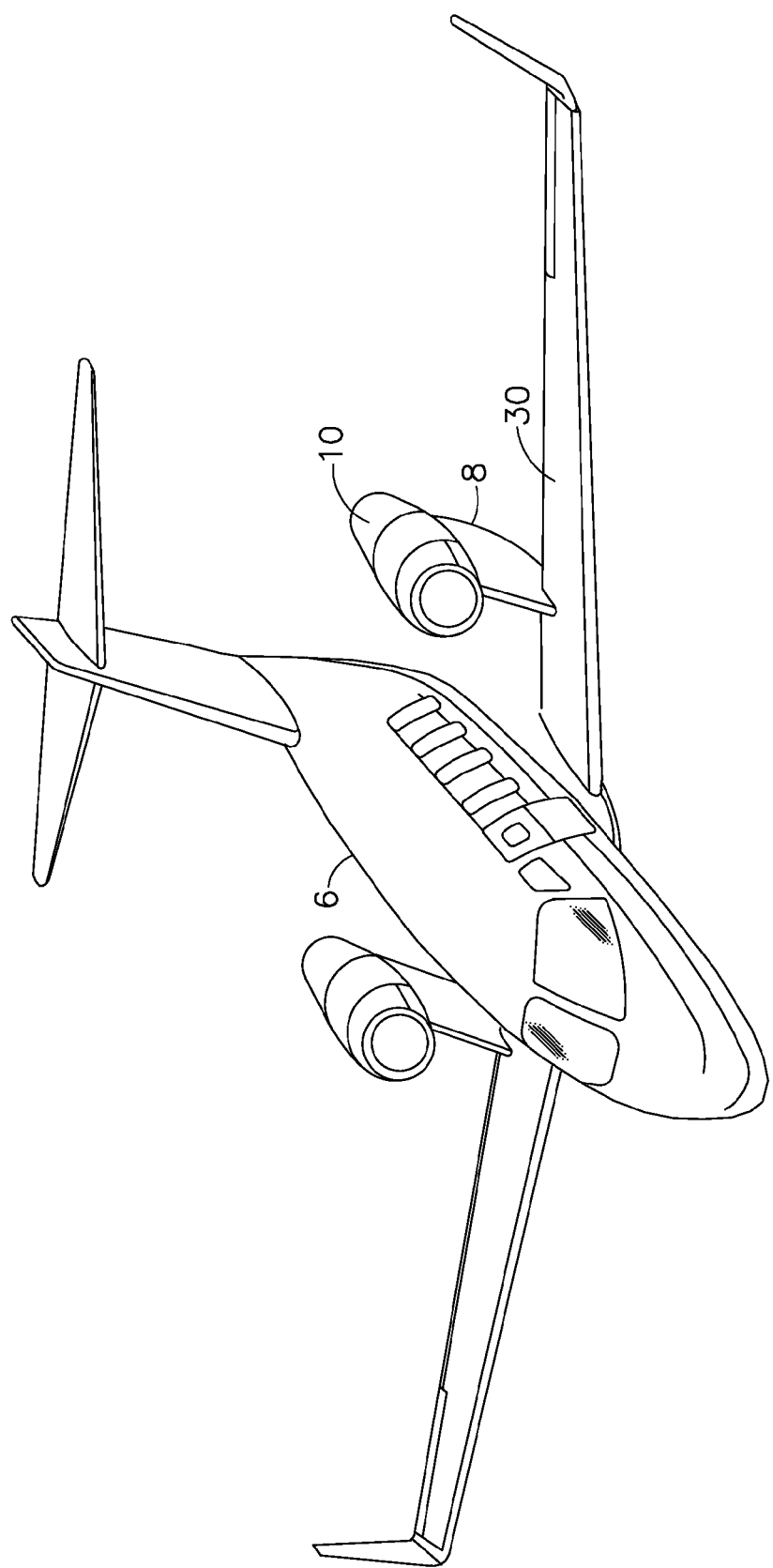
FIG. 11 is a perspective view illustration of the gas turbine engine mounted on the pylon in FIG. 3 and supported above a wing of an aircraft by the pylon.

FIGS. 3, 4, and 5 illustrate a thermally actuated vent 46 for opening and closing a vent outlet 48 at or near a top 50 of the pylon compartment 21 containing an electronic engine control 17 which may be a full authority digital electronic control (FADEC). The engine 10 is mounted above a wing 30 of an aircraft 32 by a pylon 34 as illustrated in FIG. 11. The full authority digital electronic control (FADEC) within the pylon compartment 21 inside of the pylon 34 and surrounded at least in part by a pylon fairing 23. A top wall 70 upwardly bounds the pylon compartment 21 and is part of a deflector 72 for deflecting exhaust flow out of an exhaust nozzle 74 of the engine 10. A thermally actuated venting system 12 includes a thermally actuated vent 46 for opening and closing a vent outlet 48 of the pylon compartment 21. The vent outlet 48 is located at or near a top 50 of the pylon compartment 21 in the top wall 70 or the deflector 72. The thermally actuated vent 46 is used to vent the pylon compartment 21 when it gets hot due to heating such as may occur during and after engine shutdown due to soak back. The thermally actuated vent 46 illustrated herein includes a hinged door 52 that is opened and closed by a thermal actuator 54 stored or mounted in the pylon compartment 21. Other embodiments of the thermally actuated vent are contemplated, including, but not limited to thermally actuated valves.

When the hinged door 52 are closed as illustrated in FIGS. 1 and 5 the thermal actuators 54 are exposed to the heat that is in the compartments. If the heat and temperature in the compartments are great enough then the thermal actuators 54 activate and open the door 52. When the temperature in the compartments are low then the doors remain closed or close if they are open. FIGS. 6 and 7 illustrate a thermal actuator 54 including a piston 90 disposed within a cylinder 92 and a chamber 94 within the cylinder 92 between the piston 90 and a bottom wall 96 of the cylinder 92. A piston rod 98 extends upwardly from the piston 90 through an aperture 100 in a top wall 102 of the cylinder 92.

FIGS. 1, 4, and 5 illustrate the cylinder 92 pivotably or otherwise operably connected or grounded within the respective compartment and a distal end 104 of the piston rod 98 pivotably or otherwise operably connected to the hinged door 52. A phase change material 110 illustrated in FIGS. 6 and 7 as a fluid is contained in the chamber 94 of the cylinder 92 and a chamber 94 with the aid of a piston ring 112 circumferentially disposed in a groove 114 in the piston 90 between the piston 90 and an annular cylinder wall 116 of the cylinder 92. When the temperature of the respective compartment is below the predetermined actuation temperature, then the phase change material 110 is in a liquid state and the thermal actuator 54 is retracted or closed with the piston rod 98 in a fully retracted position within the chamber 94 as illustrated in FIG. 6. When the temperature of the respective compartment is above the predetermined actuation temperature then the phase change material 110 is in a gaseous state and the thermal actuator 54 is extended or open with the piston rod 98 in a fully extended within the chamber 94 as illustrated in FIG. 7.

A thermal fuse 120 may be incorporated in the thermal actuator 54 or installed in the respective compartment so that the door 52 closes if there is ever a fire in the compartment (typically not required in the fan compartment). A portion 122 of or the entire piston rod 98 or a portion 123 of or the entire annular cylinder wall 116 of the cylinder 92 may be made of a fuse material so that it serves as the thermal fuse 120. A fuse material such as a composite material or alloy may be used for the thermal fuse 120 using, for example, Zinc which melts at 786 degrees Fahrenheit and Magnesium which melts at 1202 degrees Fahrenheit. The fuse material has a melting point substantially above the predetermined actuation temperature such as in a range between 786 degrees and 1202 degrees Fahrenheit.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

The invention claimed is:

1. A thermally actuated venting system comprising:
    a thermally actuated air vent for opening an air vent outlet in a gas turbine engine associated compartment, the vent outlet located at or near the top of the compartment,
    a passive thermal actuator in the compartment, the thermally actuated air vent including a hinged door operably connected to the passive thermal actuator for opening the vent outlet, a thermal fuse incorporated in the thermal actuator for closing the door during a fire in the compartment,
    the thermal actuator operable for opening the thermally actuated air vent based on a temperature of the compartment and venting hot air from the compartment, the thermal actuator including a piston disposed within a cylinder, a chamber within the cylinder between the piston and a bottom wall of the cylinder, a piston rod extending upwardly from the piston through an aperture in a top wall of the cylinder, a distal end of the piston rod connected to the hinged door, and
    a phase change material in the chamber having a liquid state below a predetermined actuation temperature and a gaseous state above the predetermined actuation temperature,
    the thermal fuse including the piston rod or a portion of the piston rod made of a fuse material having a melting point above the predetermined actuation temperature and the melting point being in a range between 786 and 1202 degrees Fahrenheit.

2. The system of claim 1, further comprising the associated compartment being a fan compartment between a gas turbine engine fan cowl and a gas turbine engine fan casing and an electronic engine control mounted in the fan compartment.

3. The system of claim 1, further comprising the associated compartment being a core engine compartment circumscribed by a core engine cowl.

4. The system of claim 1, further comprising the associated compartment being a pylon compartment in a pylon for mounting an engine above an aircraft wing.

5. The system of claim 4, further comprising:

the thermal actuator including a piston disposed within a cylinder, the pylon compartment located inside of the pylon and surrounded at least in part by a pylon fairing, the thermally actuated vent disposed in a top wall upwardly bounding the pylon compartment, and the top wall being part of an engine exhaust deflector.

6. A thermally actuated venting system comprising:

a thermally actuated air vent for opening an air vent outlet in a gas turbine engine associated compartment, the vent outlet located at or near the top of the compartment, a passive thermal actuator in the compartment, the thermally actuated air vent including a hinged door operably connected to the passive thermal actuator for opening the vent outlet, a thermal fuse incorporated in the thermal actuator for closing the door during a fire in the compartment, the thermal actuator operable for opening the thermally actuated air vent based on a temperature of the compartment and venting hot air from the compartment, the thermal actuator including a piston disposed within a cylinder, a chamber within the cylinder between the piston and a bottom wall of the cylinder, a piston rod extending upwardly from the piston through an aperture in a top wall of the cylinder, a distal end of the piston rod connected to the hinged door, and a phase change material in the chamber having a liquid state below a predetermined actuation temperature and a gaseous state above the predetermined actuation temperature, the thermal fuse including an annular cylinder wall of the cylinder or a portion of the cylinder wall made of a fuse material having a melting point above the predetermined actuation temperature and the melting point being in a range between 786 and 1202 degrees Fahrenheit.

7. The system of claim 6, further comprising the associated compartment being a fan compartment between a gas turbine engine fan cowl and a gas turbine engine fan casing and an electronic engine control mounted in the fan compartment.

8. The system of claim 6, further comprising the associated compartment being a core engine compartment circumscribed by a core engine cowl.

9. The system of claim 6, further comprising the associated compartment being a pylon compartment in a pylon for mounting an engine above an aircraft wing.

10. The system of claim 9, further comprising:

the thermal actuator including a piston disposed within a cylinder, the pylon compartment located inside of the pylon and surrounded at least in part by a pylon fairing, the thermally actuated vent disposed in a top wall upwardly bounding the pylon compartment, and the top wall being part of an engine exhaust deflector.

* * * * *